July 7, 1970  H. J. ORR  3,519,976
DISCONNECT FOR ELECTRIC METERS
Filed Sept. 8, 1967
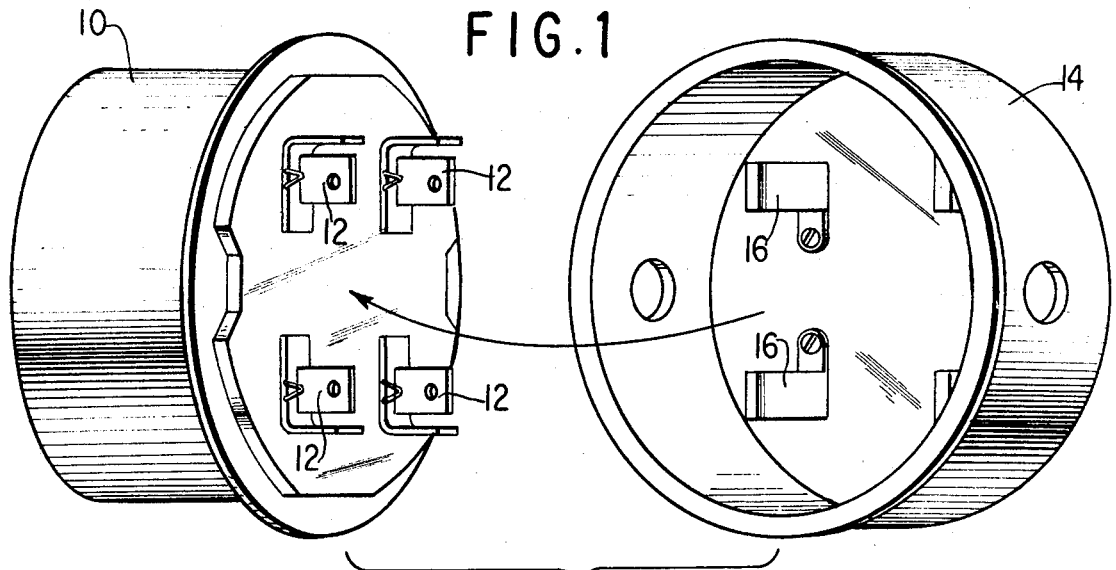
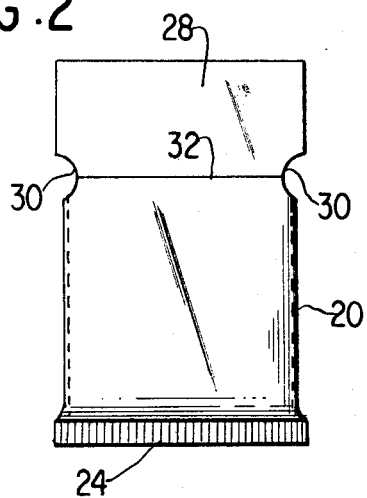
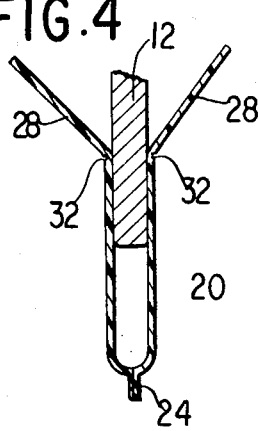
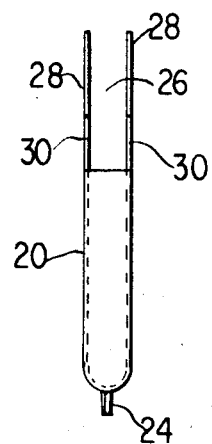
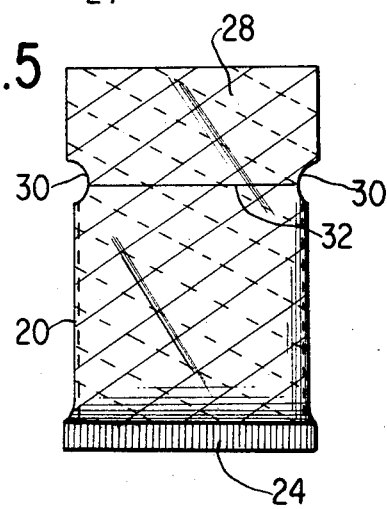
INVENTOR
HARLEY J. ORR
BY
Smythe & Moore
ATTORNEYS

United States Patent Office 3,519,976
Patented July 7, 1970

---

3,519,976
DISCONNECT FOR ELECTRIC METERS
Harley J. Orr, Bedford, N.H., assignor to Sola Basic Industries, Inc., Milwaukee, Wis., a corporation of Wisconsin
Filed Sept. 8, 1967, Ser. No. 666,273
Int. Cl. H01r *13/44*
U.S. Cl. 339—36                                2 Claims

ABSTRACT OF THE DISCLOSURE

A device for use on blades of meters for temporarily disconnecting the same, there being insulating sheaths for placing on the blades, such sheaths being formed from continuous tubing sealed at one open end.

This invention relates to electric watt-hour meters and the like and more particularly to an improved insulating device for temporarily disconnecting the blades of such meters from their receiving sockets or clips on a base receptacle while the meter is in place.

---

Embodiments of such a device are shown in U.S. Pat. No. 2,643,362. The purpose of the device, as indicated above and more specifically set forth in said patent, is to permit an electric meter to remain in place during temporary discontinuance of service, such as between a residence or the like and a utility line. It has been found, however, that due to variations in the thickness and structure of the source of the blades and clips furnished by different manufacturers, a more universal device is desirable.

One of the objects of the present invention is to provide an improved insulating sheath for a blade and socket assembly in the electric meter art which is adaptable for universal use with meters and socket receptacles supplied by various manufacturers.

A further object of the invention is to provide an insulating sheath of the character above described which comprises a simple and effective construction.

In its principal aspect, the invention comprises a tube of polyester, such as that sold under the trademark "Mylar," a trademark of Du Pont, insulating material sealed at one end and flattened or shaped to provide an insulating sheath for the blade of a detachable watt-hour meter or the like. The tubular sheath is preferably formed from an elongated tube of the plastic material which is cut into desired lengths and has one end sealed by sonic or similar means. The opposite end of the cut tube is provided with a pair of slits or slots which provide portions of the sheath that can be bent outwardly from the flattened condition of the tube to provide outwardly extending flaps. All of these steps are adapted to be performed on an automotive type of machine. The wall of the elongated tubular member, furthermore, may be plastic spirally wound from a strip of the material or from a plurality of very thin plies of such material to give additional strength along with flexibility.

In a second aspect of the invention, the flattened tubular sheath may be provided with notches and/or score lines at the bottoms of the aforesaid slits or slots to assist in bending the aforesaid flaps outwardly.

Other objects, features and advantages of the invention will become apparent from the following description taken in connection with the accompanying drawing which illustrates an exemplary embodiment of the invention.

In the drawing:

FIG. 1 is an isometric view of an electrical meter and its associated base receptacle;

FIG. 2 is a plan view of a flattened tubular insulating sheath formed in accordance with the present invention;

FIG. 3 is a side view of the sheath of FIG 2;

FIG. 4 is a sectional view showing the insulating sheath partially applied to a blade of the meter of FIG. 1; and FIG. 5 illustrates a sheath similar to that of FIG. 2 which is formed from a spirally wound tube.

Referring to the drawing and more particularly to FIG. 1, there is shown a meter 10 provided with contact blades 12 and a base receptacle 14 having socket clips 16 adapted to receive blades 12 of the meter. As is well known in the art, the base receptacle 14 is adapted to be secured to a wall of a residence or box and serves to connect the house current with a utility line when a meter is installed therein. When a residence becomes temporarily vacant, however, it is desirable to disconnect the meter from the line supply while leaving the meter in place.

In accordance with the present invention, there is provided a sheath 20, FIGS. 2 and 3, comprised of a plastic material such as "Mylar" formed in the shape of a flattened tube as shown in FIGS 3 and 4. The bottom or one end 24 of the tubular sheath 20 is sonically or otherwise suitably sealed and the upper or other end of the sheath is provided with longitudinally extending slits or slots 26. The slits or slots 26 provide tabs or end portions 28 on the sheath 20 which are adapted to be bent outwardly as shown in FIG. 4 to assist in placing the sheath on the blades 12, and in removing the sheaths from the blades or the socket clips 16 upon reconnecting the meter. Rounded notches 30 are preferably also cut or punched in the sheath 20 at the bottoms of the slits 26 to assist in bending the tabs 28 outwardly, and a slight score 32 may be made in the flat sides of the sheath at the notches 30 further to assist in this purpose.

By using "Mylar" or a similar polyester material for the tubular sheath member, the walls may have a thickness of only ±.002 inch. The tube can be spirally wound or wrapped with longitudinal seams from one or more strips of the insulating material, and in the present embodiment, the tube wall is formed from four plies of "Mylar" each .002 inch thick and spirally wound in opposite directions. Spirally wrapped or wound material gives better resistance to tear, puncture and the like, and also withstands flexing better.

As above stated, the sheaths 20 may be cut in the desired lengths from an elongated tube of insulating material. The slits 26 and notches 30 may be cut and/or punched in the tube by suitable dies or the like prior to the flattening thereof. The tube may then be flattened and cut off at the top of the slits after a predetermined length of the flattened tube has been fed past the cutters. Simultaneously, the opposite end of the flattened sheath member may be sonically or otherwise sealed by a suitable sealing device to close the previously cut open end. Alternatively, the tube may be cut off prior to the flattening operation. The scores 32 may be made simultaneously with the cutting operation when the tube is first flattened.

As above set forth, a polyester such as "Mylar" is preferred for the sheath tubing. Other materials such as vinyl, nylon and the like may, however, also be employed.

While certain exemplary embodiments of the invention have been illustrated and described, it is to be understood that alterations, changes and modifications may be made therein without departing from the spirit of the invention.

What is claimed is:

1. In an electrical meter wherein a meter and base assembly have interconnective blades and sockets, a disconnecting device comprising a thin walled tubular member of insulating material adapted to fit over said blade, said tubular member being in the form of a flattened sheath adapted completely to surround said blade, and said sheath being sealed at one end and comprising a spirally wound tube of insulating material.

2. In an electrical meter wherein a meter and base assembly have interconnective blades and sockets, a disconnecting device comprising a thin walled tubular member of insulating material adapted to fit over said blade, said tubular member being in the form of a flattened sheath adapted completely to surrond said blade, and said sheath being sealed at one end and comprising a plurality of plies of wound insulating material.

References Cited

UNITED STATES PATENTS 2,643,362  6/1953  Johansson _____ 339—36
3,331,106  7/1967  Ruskin _____ 292—307

MARVIN A. CHAMPION, Primary Examiner

J. H. McGLYNN, Assistant Examiner

U.S. Cl. X.R.

229—53